United States Patent [19]
Kendall et al.

[11] Patent Number: 6,122,069
[45] Date of Patent: Sep. 19, 2000

[54] EFFICIENT METHOD OF MODIFYING AN IMAGE

[75] Inventors: Luke Kendall, Marrickville; Scott Thomas Newham, Marsfield, both of Australia

[73] Assignee: Canon Kabushiki Kaisha, Tokyo, Japan

[21] Appl. No.: 09/026,616

[22] Filed: Feb. 20, 1998

[30] Foreign Application Priority Data

Feb. 20, 1997 [AU] Australia .................................. PO5184

[51] Int. Cl.$^7$ .............................. G06K 15/00; G06K 9/54; G06T 5/00
[52] U.S. Cl. ........................... 358/1.9; 382/302; 382/254; 358/530; 358/448
[58] Field of Search ........................... 358/1.9, 518, 528, 358/530, 531, 532, 447, 448, 450, 451, 452, 463; 382/254, 266, 274, 275, 302; 355/40, 41, 54, 77

[56] References Cited

U.S. PATENT DOCUMENTS

| | | | |
|---|---|---|---|
| 5,274,418 | 12/1993 | Kazami et al. | 355/40 |
| 5,485,557 | 1/1996 | Sato et al. | 345/429 |
| 5,694,514 | 12/1997 | Evans et al. | 358/906 |
| 5,900,909 | 5/1999 | Parulski et al. | 382/296 |

*Primary Examiner*—Scott Rogers
*Attorney, Agent, or Firm*—Fitzpatrick, Cella, Harper & Scinto

[57] ABSTRACT

A method of generating one or more live images includes the step of providing a raster-based raw image representation. A repaired image representation is then generated, based on the raw image representation and one or more selected first image effects from a first set of image effects. Following this, a live image representation is generated, based on the repaired image representation and one or more selected second image effects from a second set of image effects, such that the live image representation incorporates the selected first and second image effects. Finally, the live image representation is rendered to a screen or printer.

46 Claims, 6 Drawing Sheets

EFFICIENT METHOD OF MODIFYING AN IMAGE

FIELD OF THE INVENTION

The present invention relates to manipulation of digital images for display, and in particular to applying repairs and effects to images in a manner which enables undoing of repairs and the effects to the images in a relatively efficient fashion.

BACKGROUND OF THE INVENTION ART

Electronic photo-albums have become increasingly popular in recent times. These electronic photo-albums typically take the form of a collection of images stored using a non-volatile memory device, from which a user can retrieve the image for displaying on a display device. Usually, the images are gathered in digital form, and may, for example, be scanned by an electronic scanner, down-loaded from the internet or produced by a digital camera. A collection of these images can be stored electronically to create an electronic photo-album, analogous to the traditional family photo-album which uses photographic prints.

Presently, electronic photo-albums take the form of a collection of images, a user of the album being able to associate a caption or brief description with each image. For example, a user can collect a series of family photographs of a wedding, whether from a digital video or still camera, and associate a caption such as the date and a brief description of the event with each Image. If desired, an electronic photo-album can be reproduced from the memory device by a high quality output device, such as a high resolution colour printer, to produce an album substantially similar to a conventional photo-album.

However, these electronic photo-albums do not generally provide management capabilities to efficiently experiment with a plurality of special effects and photo-image repair. Further, they do not provide for the undoing of the effects and repairs in an efficient manner, and in a fasion which ensures the original image is restored.

It is an object of the invention to overcome, or at least ameliorate, one or more of the disadvantages of the prior art.

SUMMARY OF THE INVENTION

Accordingly, in a first aspect, the invention provides a method of generating a plurality of live image data sets, each live image data set representing an image having one or more predetermined image effects, said method comprising the steps of:

providing a raw image representation comprising one or more raster based images;

constructing one or more repaired image representations each being associated with the raw image representation and providing a first set of image effects;

creating one or more live image representations each being associated with at least one repaired image representation and each live image representation providing a second set of image effects; and rendering said live image representations, wherein each live image representation associated with a repair image representation inherits the set of first image effects In a second aspect, the invention provides a the apparatus according to paragraph 11, further comprising means for generating a sequence of image manipulation instructions using said at least one live image data set to be carried out by said rendering processor.

In a third aspect, the invention provides an apparatus according to any one of paragraphs 11 to 16, further comprising means for generating raw data coupled to said memory to provide one or more raw data sets.

BRIEF DESCRIPTION OF THE DRAWINGS

An embodiment of the present invention is described hereinafter with reference to the drawings, in which.

DETAILED DESCRIPTION

Figure 1:
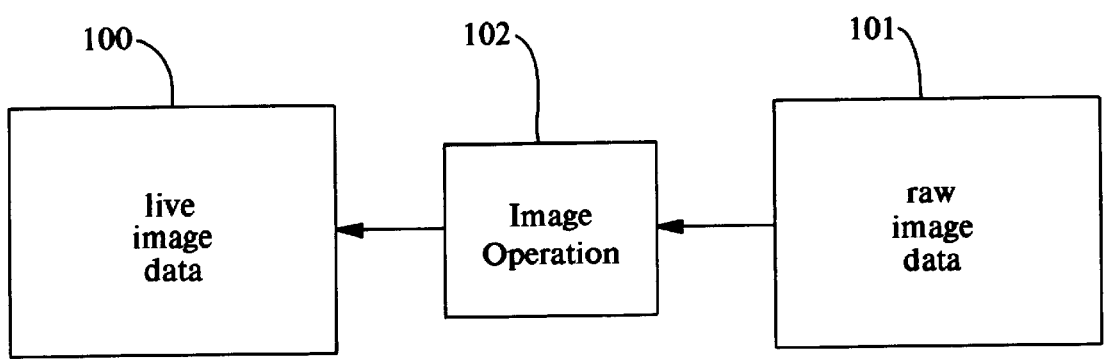
FIG. 1 is a block diagram providing an overview of a preferred embodiment of the invention.

Referring to the drawings, a schematic block representation is illustrated in FIG. 1 to provide an overview of a preferred embodiment of the present invention. Live image data 100 encapsulates raw image data 101 in a raster based format, and a series of image operations that are applied to the raw image data 101. The raw image data 101 preferably comprise a plurality of pixel-based images produced by a digital video or still camera, or image data produced by a digital scanner. For example, a photograph taken by a conventional still camera can be scanned into a memory storage device using a digital scanner.

The image operations 102 apply repairs and/or special effects to the raw image data 101. A repair effect may include such operations as "red-eye" removal (often caused by flash photography), scratch removal, dust removal, colour correction, and unsharp filtering, amongst others. A special effect may include such operations as sepia effect, monochrome effect, mirror reflection, rotation, cropping or resizing, and blurring effects, amongst others. A displayed image (ie, a pixel representation) of the Live image data is, preferably, not realised until the live image data is rendered. The technique adopted for the preferred embodiment of the invention involves constructing live image data (and preferably a realised pixel representation) by applying one or more operations to the raw image data 101 in such a manner that the raw image data 101 remains unaltered.

Figure 2:
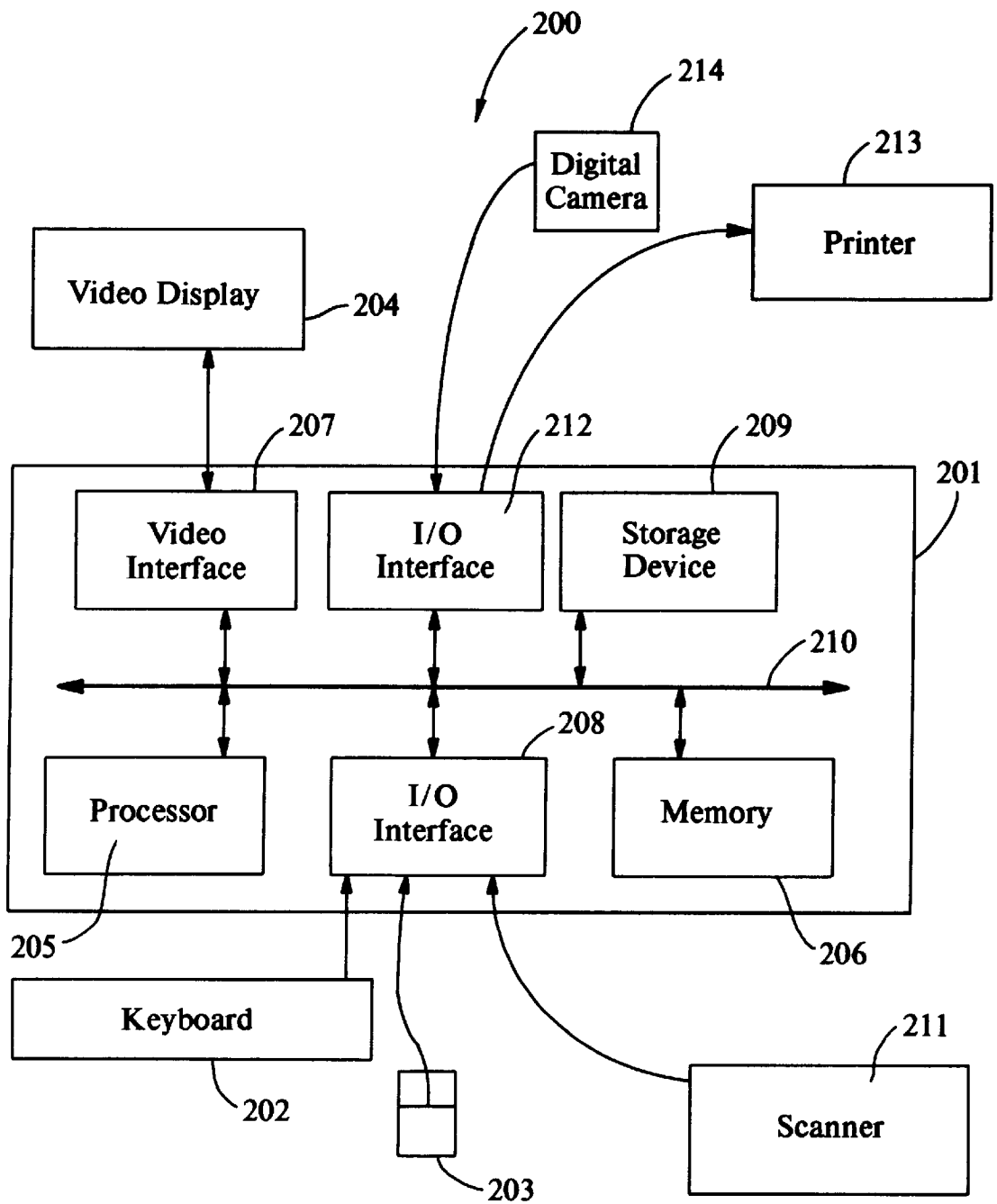
FIG. 2 is a block diagram of a general purpose computer upon which the invention may be implemented.

The invention is practised using a conventional general-purpose computer, such as that shown in FIG. 2, wherein the image manipulation is implemented as software executed on the computer. The computer system 200 comprises a computer 201, input devices 202, 203 and a display device 204.

The computer 201 comprises at least one processor unit 205, a memory unit 206 which typically includes random access memory (RAM) and read only memory (ROM), and input/output (I/O) interfaces including a video interface 207, and an interface 208 for a keyboard 202, an input digital scanner device 211 and mouse (or joystick) 203. The storage device 209 can include one or more of the following devices: a floppy disk, a hard disk drive, a CD-ROM drive or similar non-volatile storage devices known to those skilled in the art. Further, the general-purpose computer can have additional I/O interfaces 212 for such peripheral devices as a printer 213 and/or a photographic (video or still) camera 214 for downloading images to the computer. The components 205 to 209 and 212 of the computer 201 typically communicate via an interconnected bus 210, and in a manner which results in a usual mode of operation of the computer system 200 known to those skilled in the relevant art. Examples of computers on which the embodiment can be practised include IBM-PC/ATs and compatibles, Sun Sparcstations or like computer systems.

Figure 3:
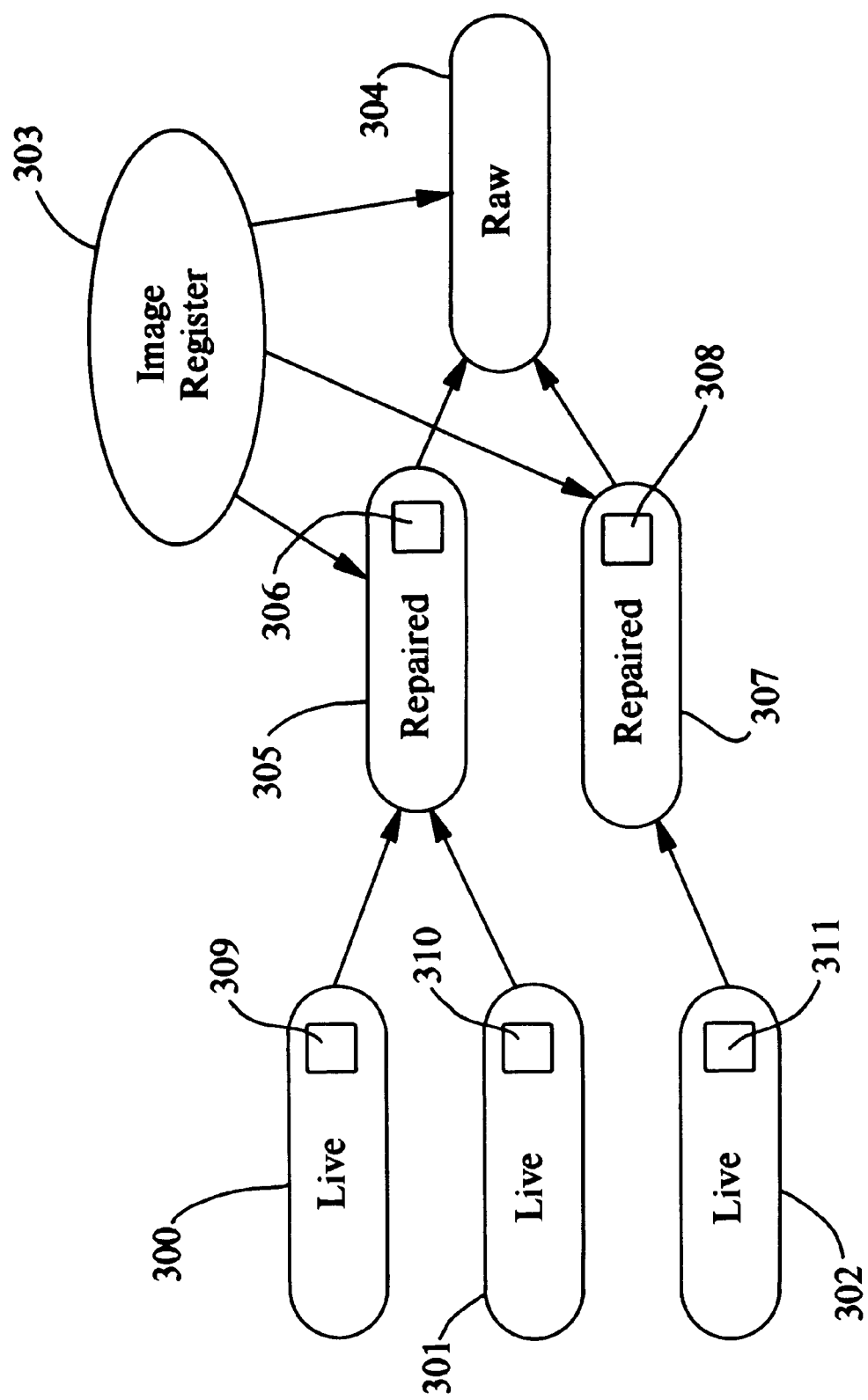
FIG. 3 illustrates an example of a relationship between a live image, repaired image and raw image data according to the invention.

Turning to FIG. 3, there is shown a schematic diagram of an example of a plurality of live image data sets (reference numerals 300 to 302) associated with a set of so raw image data 304 representing a single raster image. Arrows with solid heads indicate lines associated with reference numerals, whilst the arrows with non-solid heads indicate referencing of repaired image data and raw image data in an image register 303, which is discussed below. A first set of repaired image data 305 comprising a first sequence of image operations 306 is shown, together with a second set of repaired image data 307 comprising a second series of image operations 308. Associated with the first set of repaired image data 305 are two sets of live image data (300, 301), each comprising a sequence of additional image operations (309, 310) further to the image operation 306 of the associated set of repaired image data 305.

The third set of live image data 302, also comprising a series of operations 311, is associated with the set of second repaired image data 307.

Each live image data set (301, 302) represents, when rendered, a pixel based image having raw image data 304 in common and having different repairs and special effects applied. Two of the sets of live image data (301 and 302) have the first set of repaired image data 305 in common. Therefore, a pixel-based image resulting from each of the two sets of live image data (301, 302) share repair and/or effect operations.

An image register 303 tracks repaired image data (305, 307) and evaluates whether the repair image data is still in use by a live image data (items 300 to 302).

This embodiment of the invention allows for a plurality of sets of repaired image data for each raw image data, and for a plurality of sets of live image data for each set of repaired image data. In this manner, a plurality of sets of live image data can share a set of repaired image data and therefore have substantially the same repair effected on each one of the sets of live image data sets. The live image data may be rendered to a pixel representation for display on a display device 204 (or a printer 213), and each set of live image data represents one image in the pixel representation. A user of the system manipulates the live image data by applying (or selecting) desired image operations on the pixel representation. For example, a user may desire to rotate a displayed image associated with a live image data set which in turn is associated with a repaired image data. The user selects a rotation operation for the displayed image, which is then inserted as an operation instruction into the live image data set and a corresponding rotated displayed image is generated. Preferably a pixel representation of the repaired image data or raw image data is not realised to the display device 204.

If an operation is to be applied to pixel representations of live image data associated with a set of repaired image data, the operation is inserted in the set of repaired image data. This results in all image data associated with that set of repaired image data to inherit the effects of the operation. For example, a "red-eye" removal operation can be performed on a plurality of pixel representations of live image data so associated with a particular set of repaired image data, by inserting the red-eye removal operation as an instruction sequence of the repaired image data.

Repair operations and special effects operations affecting a single image are inserted as operation instructions into live image data corresponding to the single image. Repair operations and special effects operations affecting a plurality of images associated with sets of live image data, which are in turn associated with a single set of repaired image data, are inserted as operation instructions into the single set of repaired image data. Consequently, changes to a pixel representation affected by a repair operation or special effect operation can be "undone" by removing the corresponding operation instruction from a live image data associated wit the pixel representation, and then realising a pixel representation from the live image data with the removed operation. Accordingly, removing an operation instruction from a set of repaired image data will "undo" the operation for any associated sets of live image data. Thus, the described arrangement a relatively efficient procedure for undoing repair and special effect operations applied to one or more images.

Further, providing a single repository of raw image data for a plurality of sets of image data from which a plurality of images (pixel representation) can be rendered reduces storage requirements.

Preferred components of the invention are described separately hereinafter.

1. Raw Image data

Raw image data consists of raster image data for one or more images, each raster image data preferably being stored, in a single repository (a non-volatile storage means), as both high and low resolution data.

Preferably, when a live image is rendered to a pixel representation for a display device, the low-resolution data of the raw image data is used, conversely, when the live image data is rendered to a printing device, the high resolution data is used. Utilising the low resolution data provides a speed advantage in rendering, which is particularly useful for display devices whilst using the high resolution data provides enhanced quality for the rendered image, which is desirable for printing applications.

2. Repaired Image Data

Repaired image data includes a link in the form of a reference pointer to raw image data and a sequence or list of repair operations and/or special effects operations to be applied to the raw image data.

3. Live Image Data

Live image data includes a link in the for reference pointer to a repaired image data and a set or series of repair and/or special effects operations (repairs and/or special effects operations) that are to be applied to raw image data in addition to operations associated with the repaired image data. Operations are inserted to and removed from the live image data. When an operation is to affect all live image data associated with a repaired image data the operation is inserted into the repaired image data, and typically passed down to the repaired image data via the live image data.

4. Image Register

An image register maintains a reference pointer to each set of repaired image data and raw image data loaded in memory (which preferably is Random Access Memory (RAM)). A plurality of reference counters are also maintained by the image register, which track how many sets of live image data, and sets of repair image data, are associated (via reference pointers) with a raw image data. The reference counters facilitate the sharing of images through reference counting. For example, if two sets of live image data share a set of repaired image data, then a corresponding reference counter has a value of two. If the two live image data sets are deleted (typically by a user), the reference counter drops to zero. Since the corresponding repaired image data is no longer in use, it is removed from memory making the memory available. In this way, the image register enables memory to be reclaimed when a set of repaired image data or a raw image data is no longer used.

5. Image Operations

As previously described, image operations may include one or more repair operations and one or more special effects operations. Preferably, image operations inserted into sets of live image data are special effects operations, whilst repair operations are preferably inserted into sets of repaired image data. However, the image operations may also be inserted interchangeably in the sets of live image data or the sets of repair image data.

Image operations form part of an abstract class structure and do not themselves implement repairs or special effects on an image. To implement an image operation, an instruction routine is implemented together with predetermined information to generate an image manipulation instruction set. For example, a rotate operation requires predetermined information (eg. angle of rotation) and an instruction routine for the rotation operation that generates a set of image manipulation instructions to rotate the image.

Figure 4:
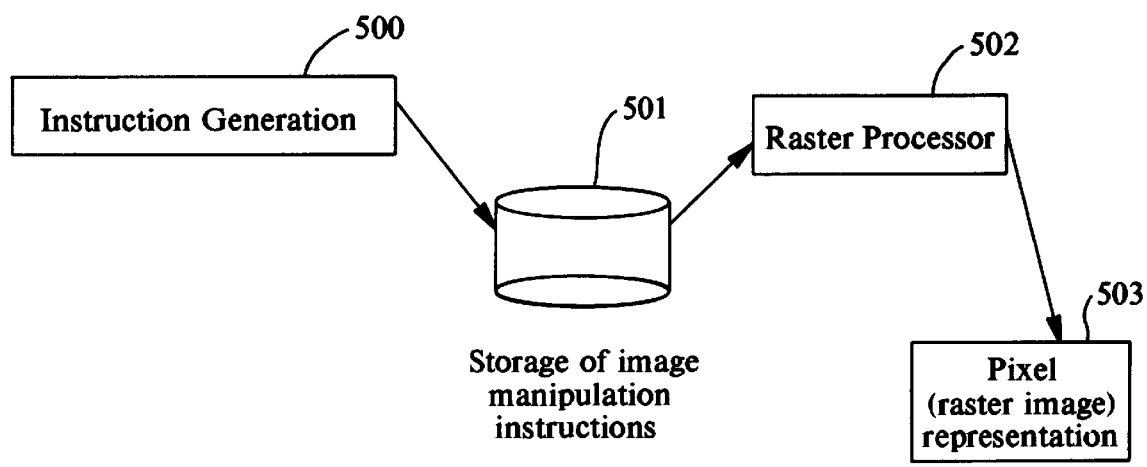
FIG. 4 illustrates an example of a hierarchical structure in executing image operations according to the invention.

Turning to FIG. 4, there is shown an example of a hierarchical data structure of image operations in accordance with a preferred embodiment. Live image data 400 incorporates a rotation operation 401 and a reference pointer 402 to repaired image data 403. The rotation operation has associated predetermined information 404 (eg. angle of rotation). The repaired image data 403 incorporates a "red-eye" removal operation 407 and a reference pointer 405 to a raw image data 406 comprising a pixel-based image. The red-eye removal operation 407 has associated therewith predetermined information 408 relating to the operation (eg. red-eye removal data).

When the live image data 400 is rendered to a pixel representation, preferably for printing or display, red-eye removal 407 is performed in conjunction with the raw image data. A rotation operation 401 is subsequently performed to result in a rendered pixel representation of the raw image data that has been red-eye corrected and rotated as desired. If a user chooses to undo the rotation operation 401, the rotation operation 401 is removed from the live image data 400 and the reference pointer 402 to the repaired image data 403 is maintained. The live image data 400, with the rotation operation 401 removed, is re-rendered to produce a pixel representation of the raw image data having been red-eye corrected only.

A render process for producing a pixel representation of a live image involves applying each operation in turn to raw image data. The render process consists of two stages, being:

(1) production of image manipulation instructions; and (2) execution of the image manipulation instructions to produce a pixel representation in the form of a raster-based image.

At the first stage, instructions are recorded in a data stream to be executed during the second stage. The data stream may consist of a data file containing instructions or a data structure in memory representing a series of instructions for performing an operation.

The render process begins by requesting a most recent operation inserted into a live image data to generate an instruction sequence. The instruction sequence recursively calls an operation that was inserted into the live image data before a current operation. This recursive activity forms a chain of calls from most recent operation to least recent operation, with each operation generating a corresponding instruction sequence. When a last live image data operation is reached, a call is generated for a most recent operation of the repaired image data. The generation of an instruction sequence for each operation of the repaired image data is described in a substantially similar manner as for the generation of the instruction sequence for each operation of the live image data referred to above. When the last operation of the repaired image data is called, an instruction to import raw image data is added to the data stream.

The second stage involves executing the data stream, and is typically a more computationally intensive process in comparison to the instruction sequence generation described above. The data stream of image manipulation instructions can be stored and executed by a predetermined render processor. The data stream of image manipulation instructions can therefore optionally be rendered on a separate render processor either concurrently or remotely.

Figure 5:
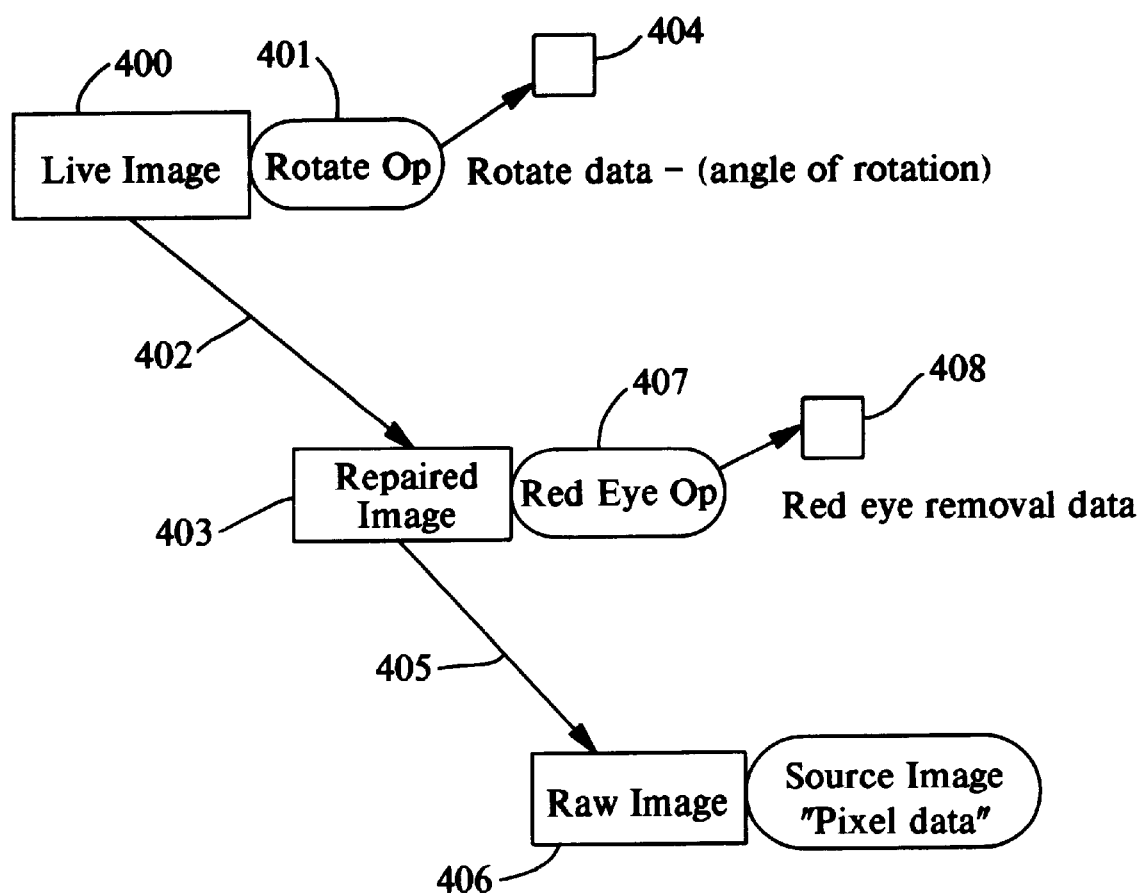
FIG. 5 is a block diagram of a rendering process according to the invention.

Referring to FIG. 5, there is shown a render process according to the preferred embodiment. An instruction sequence 500 is generated for substantially all operations incorporated in live image data and repaired image data (ie. a data stream is generated). The data stream is stored on a storage means 501 (preferably a non-volatile memory device such as a hard drive) for execution by a render processor 502 to provide a pixel representation 503.

Figure 6:
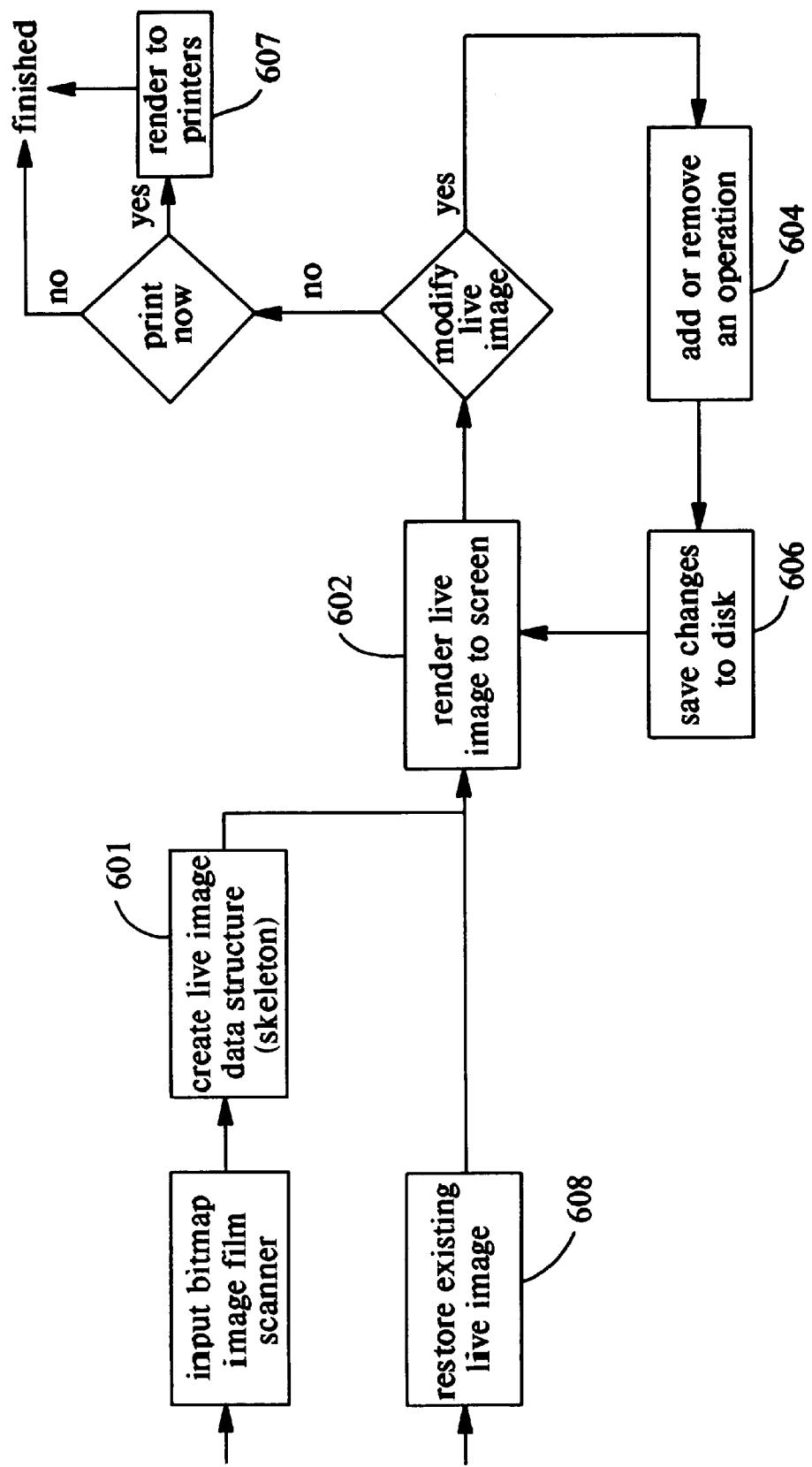
FIG. 6 is a schematic flow-chart showing a method of rendering and printing a live image, in accordance with the present invention.

Turning to FIG. 6, there is shown a flowchart setting out the basic steps in the rendering process. These steps would take place in a computer, such as that described above. Raw image data from a digital camera, scanner or the like is initially input to the computer, and a live image data structure created (block 601) in accordance with the steps outlined above. The resultant set of live image data is then rendered to the screen (block 602) for viewing by a user. If the users wishes to make modifications, operations are removed (block 604) from the relevant set of live image data, the changes saved to disk (lock 606) and the image again rendered to the screen (block 602). When the user is happy with the displayed result, live image data set is rendered to a printer (block 607). The user may also restore or retrieve a saved set of live image data from disk (block 608), which is then rendered to the screen for viewing (block 602). Further modifications may then be made or the image rendered to the printer, as described above.

Although the invention has been described with reference to a number of particular examples, it will be appreciated by those skilled in the art that the invention may be embodied in many other forms.

We claim:

1. A method of generating a plurality of live image data sets, each live image data set representing an image having one or more predetermined image effects, said method comprising the steps of:

providing a raw image representation comprising one or more raster based images;

constructing one or more repaired image representations each being associated with the raw image representation and providing a first set of image effects;

creating one or more live image representations each being associated with at least one repaired image representation and each live image representation providing a second set of image effects; and rendering said live image representations, wherein each live image representation associated with a repair image representation inherits the set of first image effects.

2. The method as recited in claim 1, wherein the first image effects comprise repair effects.

3. The method as recited in claim 1, wherein the second image effects comprise special effects.

4. The method as recited in claim 1, wherein the raw image representation comprises a plurality of resolutions of a raster based image.

5. The method as recited in claim 4, wherein the plurality of resolutions comprises a high and low resolution of a raster based image.

6. A method of providing a hierarchical structure for image manipulation, said method comprising the steps of:

creating a repaired image comprising a first list of image manipulation operations:

creating one or more live images each live image comprising a different list of image manipulation operations; and associating said repaired image and the one or more live images to produce a hierarchical structure wherein each live image associated with the repaired image inherits the first list of image manipulation operations.

7. The method as recited in claim 6, wherein the first list and the different list of image manipulation operations are further provided with a capability of removing or inserting one or more of said image manipulation operation.

8. The method as recited in claim 6, wherein the image manipulation operations comprise operation for producing repair effects and/or special effects.

9. The method as recited in claim 6, wherein said hierarchical structure for image manipulation is applied to raw image data and a result of the application is rendered to provide one or more pixel (raster image) representations.

10. An apparatus for manipulating images in accordance with the method of claim 1.

11. An apparatus for rendering a digital output image to be displayed using a reproduction device, said apparatus comprising:

a rendering processor for generating said digital output image;

a memory coupled to said rendering processor;

raw image data comprising a plurality of pixels, wherein said raw image data is stored in said memory;

means for generating at least one repaired image data set, each such repaired image data set comprising linking means referencing said raw image data and one or more operation instructions for modifying said raw image data;

means for generating at least one live image data set for each such repaired image data set, each such live image data set comprising linking means referencing each such repaired image data set and one or more operation instructions for modifying said respective repaired image data;

wherein said rendering processor generates said digital output image dependent on each of said at least one live image data set.

12. The apparatus according to claim 11, further comprising means for generating a sequence of image manipulation instructions using said at least one live image data set to be carried out by said rendering processor.

13. The apparatus according to claim 11, further comprising an image register means for storing a reference to said raw image data and a reference to each such repaired image data set.

14. The apparatus according to claim 13, further comprising means for counting said references and for removing said raw image data or said repaired image data set from memory when said raw image data or said repaired image data set has zero corresponding references.

15. The apparatus according to claim 11, wherein said image forms at least a portion of an electronic photo-album.

16. The apparatus according to claim 11, wherein said raw data comprises two sets of pixel data, wherein a first set of said pixel data has a first resolution for reproduction using a video display means and a second set of said pixel data has a second resolution for reproduction using a printing device, wherein said first resolution is lower than said second resolution.

17. The apparatus according to claim 11, further comprising means for generating raw data coupled to said memory to provide one or more raw data sets.

18. The apparatus according to claim 11, wherein said one or more modifying operations of each such repair image data set are repair operations.

19. The apparatus according to claim 11, wherein said one or more modifying operations of each such live image data set are special effect operations.

20. The apparatus according to claim 11, further comprising means for selecting one or more modifying operations and storing a corresponding modifying operation instruction in each such repair image data set or live image data set.

21. A method of generating one or more live images, the method including the steps of:

providing a raster-based raw image representation;

generating a repaired image representation, based on the raw image representation and one or more selected first image effects from a first set of image effects;

generating a live image representation, based on the repaired image representation and one or more selected second image effects from a second set of image effects, such that said live image representation incorporates the selected first and second image effects; and rendering said live image representation.

22. A method of generating one or more live images according to claim 21, wherein the first set of image effects substantially comprises repair effects.

23. A method of generating one or more live images according to claim 21 or claim 22, wherein the second set of image effects substantially comprises special effects.

24. A method of generating one or more live images according to claim 21, wherein each raw image representation includes a raster-based image represented at a plurality of resolutions.

25. A method of generating one or more live images according to claim 24, wherein the raster-based image is represented at a high resolution and a low resolution.

26. A method of generating one or more live images according to claim 1, wherein the repaired image representation includes a first list of data manipulation operations.

27. A method of generating one or more live images according to claim 26, wherein the repaired image representation includes a pointer to the raw image representation.

28. A method of generating one or more live images according to claim 21, wherein the live image representation includes a second list of data manipulation operations.

29. A method of generating one or more live images according to claim 28, wherein the live image representation includes a pointer to the repaired image representation.

30. A method of generating one or more live images according to claim 21, wherein the raw image representation is associated with a plurality of repaired image representations.

31. A method of generating one or more live images according to claim 30, wherein at least one of the repaired image representations is associated with a plurality of live image representations.

32. A method of creating a hierarchical data structure, the method comprising the steps of:

provide a raw image;

generating a repaired image based on the raw image, the repaired image including a first list of image manipulation operations;

generating one or more live images based on the repaired image, each live image including a second list of image manipulation operations distinct from the first list of image manipulation operations; and associating the repaired image and the live images to produce a hierarchical structure.

33. A method of creating a hierarchical data structure according to claim 32, further including the step of inserting or deleting one or more of the image manipulation operations into or from the first or second lists.

34. A method of creating a hierarchical data structure according to claim 32 or claim 33, wherein the image manipulation operations include repair effects or special effects.

35. A method of creating a hierarchical data structure according to claim 34, wherein the first list includes repair effects, and the second list includes special effects.

36. A method of creating a hierarchical data structure according to claim 32, wherein the live images are rendered to provide raster-based pixel images for display.

37. An apparatus for rendering an output image for display on a reproduction device, the apparatus including:

a rendering processor for generating said output image;

a memory coupled to said rendering processor, the memory containing raw image data comprising a plurality of pixels;

first means for generating a set of repaired image data based on the raw image data, the set of repaired image data including a first linking means which references the raw image data and one or more operation instructions for modifying the raw image data;

second means for generating at least one set of live image data, each of the sets of live image data being based on a repaired image data set and including a second linking means which references the set of repaired image data and one or more operation instructions for modifying the set of repaired image data;

wherein said rendering processor generates each output image based on one of the sets of live image data.

38. An apparatus for rendering an output image for display on a reproduction device according to claim 37, further comprising third means for generating a sequence of image manipulation instructions based on one or more the sets of live image data, the image manipulation instructions being configured for execution by the rendering processor.

39. An apparatus for rendering an output image for display on a reproduction device according to claim 38, further including an image register for storing a reference to said raw image data and a reference to each set of repaired image data.

40. An apparatus for rendering an output image for display on a reproduction device according to claim 39, further comprising counting means for counting said references and removing said raw image data or said set of repaired image data from memory when said raw image data or said repaired image data set has zero corresponding references.

41. An apparatus for rendering an output image for display on a reproduction device according to claim 37, wherein tile output image forms part of an electronic photo-album.

42. An apparatus for rendering an output image for display on a reproduction device according to claim 37, wherein the raw data includes two sets of pixel data, the first set of pixel data being at a first resolution for reproduction by a video display, and the second set of pixel data being at a second resolution for reproduction using a printing device, said first resolution being lower than said second resolution.

43. An apparatus for rendering an output image for display on a reproduction device according to claim 37, further including fourth means connected with the memory to generate raw data, thereby to provide one or more sets of raw data.

44. An apparatus for rendering an output image for display on a reproduction device according to claim 37, wherein one or more of the operation instructions associated with each set of repaired image data are repair operations.

45. An apparatus for rendering an output image for display on a reproduction device according to claim 37, wherein one or more of the operation instructions associated with each set of live image data are special effect operations.

46. An apparatus for rendering an output image for display on a reproduction device according to claim 37, further including fifth means for selecting one or more desired special effects or repair effects, and storing a corresponding operation instruction in the set of repaired image data or one of the sets of live image data.

* * * * *

UNITED STATES PATENT AND TRADEMARK OFFICE
CERTIFICATE OF CORRECTION

| PATENT NO. | : 6,122,069 |
|---|---|
| DATED | : September 19, 2000 |
| INVENTOR(S) | : Luke Kendall, et al. |

Page 1 of 3

It is certified that error appears in the above-identified patent and that said Letters Patent is hereby corrected as shown below:

ON THE TITLE PAGE:

Insert: --[*] Notice: This patent issued on a continued prosecution applcation filed under 37 CFR 1.53(d), and is subject to the twenty year patent term provisions of 35 U.S.C. 154(a) (2).--.

COLUMN 1:
Line 11, "BACKGROUND OF THE INVENTION ART" should read --BACKGROUND ART--;
Line 39, "fasion" should read --fashion--; and
Line 65, "a the" should read --an--.

COLUMN 2:
Line 43, "colour" should read --color--;
Line 48, "(ie," should read --(ie.,--' and close up and right margin; and
Line 49, "Live" should read --live--.

COLUMN 3:
Line 16, "of so" should read --of--;
Line 19, "whilst" should read --while--;
Line 29, close up right margin; and
Line 30, close up ledt margin.

UNITED STATES PATENT AND TRADEMARK OFFICE
CERTIFICATE OF CORRECTION

PATENT NO. : 6,122,069
DATED : September 19, 2000
INVENTOR(S) : Luke Kendall, et al.

It is certified that error appears in the above-identified patent and that said Letters Patent is hereby corrected as shown below:

COLUMN 4:
Line 6, "data so" should read --data--;
Line 18, "wit" should read --with--;
Line 34, "data" should read --DATA--;
Line 45, "whilst" should read --while--; and
Line 54, "for" should be deleted.

COLUMN 5:
Line 18: "whilst" should read --while--; and
Line 21, "interchangeably" should read --inter-changeably--.

COLUMN 6:
Line 28, "(ie, " should read --(I.e.,--.

COLUMN 7:
Line 21, "images" should read --images,--;
Line 53, "data;" should read --data; and--; and
Line 59, "data;" should read --data,--.

COLUMN 9:
Line 46, "data:" should read --data; and
Line 52, "data;" should read --data,--.

UNITED STATES PATENT AND TRADEMARK OFFICE
CERTIFICATE OF CORRECTION

PATENT NO. : 6,122,069
DATED : September 19, 2000
INVENTOR(S) : Luke Kendall, et al.

It is certified that error appears in the above-identified patent and that said Letters Patent is hereby corrected as shown below:

COLUMN 10:
Line 6, "more" should read --more of--; and
Line 23, "tile" should read --the--.

Signed and Sealed this

Twenty-sixth Day of June, 2001

Attest:

*Nicholas P. Godici*

NICHOLAS P. GODICI
*Attesting Officer*     *Acting Director of the United States Patent and Trademark Office*